United States Patent
Alwell et al.

(10) Patent No.: US 11,783,135 B2
(45) Date of Patent: Oct. 10, 2023

(54) SYSTEMS AND METHODS FOR PROVIDING AND USING TRANSLATION-ENABLED MULTIPARTY COMMUNICATION SESSIONS

(71) Applicant: VONAGE BUSINESS, INC., Atlanta, GA (US)

(72) Inventors: Kevin Alwell, Holmdel, NJ (US); Bryan Stokes, Holmdel, NJ (US)

(73) Assignee: Vonage Business, Inc., Atlanta, GA (US)

( * ) Notice: Subject to any disclaimer, the term of this patent is extended or adjusted under 35 U.S.C. 154(b) by 43 days.

(21) Appl. No.: 16/800,496

(22) Filed: Feb. 25, 2020

(65) Prior Publication Data
US 2021/0264118 A1 Aug. 26, 2021

(51) Int. Cl.
*H04M 3/56* (2006.01)
*G06F 40/58* (2020.01)
*H04L 12/18* (2006.01)
*H04L 51/04* (2022.01)
*H04W 4/08* (2009.01)

(52) U.S. Cl.
CPC .......... *G06F 40/58* (2020.01); *H04L 12/1822* (2013.01); *H04L 51/04* (2013.01); *H04M 3/567* (2013.01); *H04W 4/08* (2013.01); *H04M 2203/2061* (2013.01)

(58) Field of Classification Search
None
See application file for complete search history.

(56) References Cited

U.S. PATENT DOCUMENTS

| | | |
|---|---|---|
| 6,816,468 B1 | 11/2004 | Cruickshank |
| 9,569,431 B2 | 2/2017 | Uszkoreit |
| 2002/0161578 A1 | 10/2002 | Saindon |
| 2008/0300852 A1 | 12/2008 | Johnson |
| 2009/0125295 A1 | 5/2009 | Drewes |
| 2010/0086108 A1* | 4/2010 | Jaiswal ............... G10L 21/0272 379/88.04 |
| 2014/0132701 A1* | 5/2014 | Wang .................. H04L 12/1827 348/14.08 |
| 2016/0203127 A1* | 7/2016 | Uszkoreit ............. H04M 3/568 704/277 |

(Continued)

OTHER PUBLICATIONS

*Access-independent Cloud-based Real-Time Translation Service for Voice Calls in Mobile Networks*, Tundik, Hilt, Bota, Nagy and Luukkanen, Jul. 18, 2018.

(Continued)

*Primary Examiner* — Quynh H Nguyen
(74) *Attorney, Agent, or Firm* — FisherBroyles, LLP

(57) ABSTRACT

Systems and methods for providing a translation-enabled multiparty communication session utilize a translation service that is configured to receive individual audio streams from each participant in the communication session, and which then generates a participant text stream for each participant based on their audio stream. This can be accomplished using speech-to-text techniques. Each participant's text stream is then translated into a different language to create a translated participant text stream. Individual participants in the communication session can then subscribe to the translated participant text streams to view a translation of what each participant is saying during the communication session.

21 Claims, 8 Drawing Sheets

(56) References Cited

U.S. PATENT DOCUMENTS

| | | |
|---|---|---|
| 2017/0011740 A1 | 1/2017 | Gauci |
| 2019/0273767 A1 | 9/2019 | Nelson et al. |
| 2020/0059554 A1* | 2/2020 | Farrow ............ G11B 20/10527 |
| 2020/0294500 A1* | 9/2020 | Ferris ........................ H04N 7/15 |
| 2020/0349230 A1* | 11/2020 | Yoshioka ................ G06F 40/58 |

OTHER PUBLICATIONS

International Search Report for PCT/US2021/019311 dated Jun. 21, 2021.
Written Opinion for PCT/US2021/019311 dated Jun. 21, 2021.

\* cited by examiner

SYSTEMS AND METHODS FOR PROVIDING AND USING TRANSLATION-ENABLED MULTIPARTY COMMUNICATION SESSIONS

BACKGROUND OF THE INVENTION

The invention is related to systems and methods for providing and using multiparty communication sessions. The multiparty communication sessions could be an audio or video conference call. In particular, the invention relates to providing translation services to participants in a multiparty communication session.

There are a great many telephony service providers that can connect multiple participants together for purposes of conducting an audio conference call or a video conference. However, if all of the participants do not speak a common language, it is often necessary to engage the services of a translator who also participates in the audio or video conference call. Typically, the translator listens to what a first participant says in a first language, and then provides a spoken translation in a second language. The translator then listens to what a second participant says in the second language, and provides a spoken translation in the first language.

The use of a translator can very significantly slow the progress of the audio or video conference call. In addition, such translators can be quite expensive. Also, if the participants speak three or more languages, the process of translating between all of the spoken languages can become quite complex.

It would be desirable to have a lower cost, automated way of providing real time or near-real time translations to the participants of an audio or video conference call without the need to resort to the services of a human translator. It also would be desirable to provide translations of what a participant says into multiple different languages in real time or near-real time to accommodate situations where the participants of an audio or video call speak three or more different languages.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

The present invention is concerned with providing a translation-enabled multiparty communication session to participants. For purposes of a high-level explanation, assume that there is a multiparty communication session in which some of the participants speak English and some of the participants speak Spanish. The overall concept is to receive an audio stream from each of the participants in the communication session, and to then convert each participant's audio into a text stream using speech-to-text techniques. An English language text stream would be created for each of the participants speaking English. A Spanish language text stream would be created for each of the participants speaking Spanish.

Next, each participant's text stream is translated into a different language. This means that the Spanish language text streams for those participants speaking Spanish would be translated into English language text streams. The English language text streams for those participants speaking English would be translated into Spanish language text streams. The process of creating participant text streams and then generating translated participant text streams is accomplished very rapidly using automated computer techniques such that the translated participant text streams are available shortly after the participants actually speak.

The participants are then given the ability to subscribe to one or more of the translated participant text streams. When a first participant subscribes to a second participant's translated text stream, data comprising the second participant's translated text stream is sent to the first participant's computing device. The second participant's translated text stream is then presented to the first participant on a display screen. This allows the first participant to read in a first language what the second participant spoke in a second language very shortly after the second participant actually spoke.

A participant who speaks English can subscribe to the translated participant text streams for all the participants who speak Spanish. Conversely, a participant who speaks Spanish can subscribe to the translated participant text streams for all the participants who speak English. As a result, all participants in the multiparty communication session are able to follow what is being said by all the other participants in the communication session.

The following description explains the systems and methods that can be used to accomplish the provision of and participation in a translation-enabled multiparty communication session as outlined above.

Figure 1:
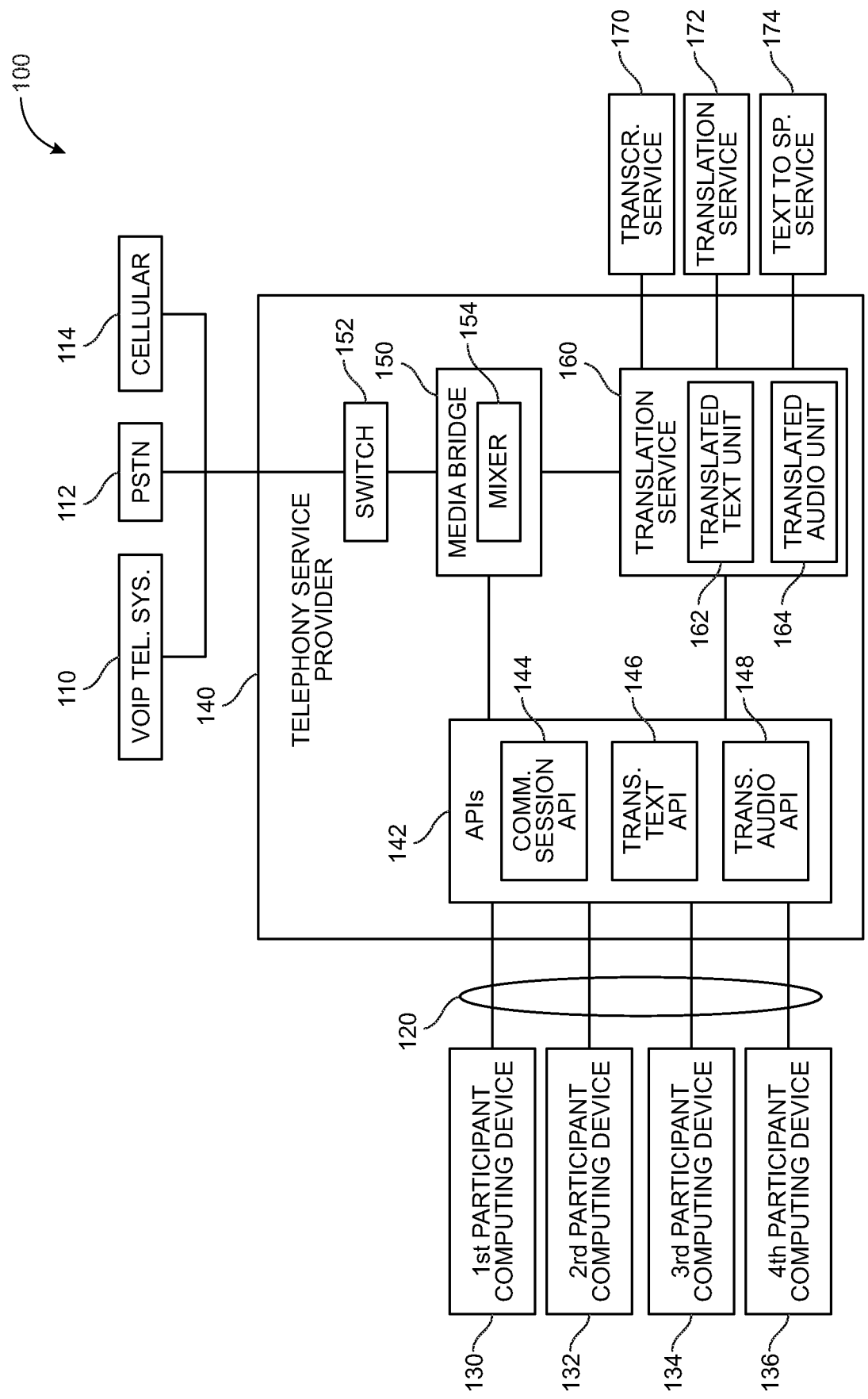
FIG. 1 is a diagram of a first communications environment that includes a telephony service provider embodying the invention.

FIG. 1 illustrates a communications environment 100 in which elements of a telephony service provider 140 provide a translation-enabled multiparty communication session to participants. The participants use computing devices 130, 132, 134, 136 which are configured to interact with application programming interfaces (APIs) 142 via a data network, such as the Internet 120. The APIs 142 allow the participant computing devices 130, 132, 134, 136 to interact with a media bridge 150 to participate in a multiparty communication session, such as an audio or video conference call. The APIs 142 also allow the participant computing devices 130, 132, 134, 136 to interact with a translation service 160 to subscribe to and obtain translated participant text streams or translated participant audio streams, as will be explained in more detail below.

Although participants can use participant computing devices 130, 132, 134, 136 to obtain translation services for a multiparty communication session, it is also possible for some participants in the multiparty communication session to access the multiparty communication session via a VOIP telephony services provider 110, a traditional PSTN 112 or a cellular telephony system 114. In that instance, the participant would use a traditional telephony device to access an audio conference, or a computing device to access a video conference. The telephony service provider 140 includes a switch 152 to accommodate such alternate devices. While those participants could participate normally in the multiparty communication session, they would be unable to access the translated participant text streams or translated participant audio streams.

The APIs 142 include a communication session API 144 that is used to provide a participant's computing device with access to the multiparty communication session. The communication session API 144 handles the initial setup of joining the participant's computing device to the multiparty communication session. In some embodiments, the communication session API 144 also receives an audio stream from a participant and passes it along to the media bridge 150. The communication session API 144 may also obtain a mixed audio stream of all participants from the media bridge 150 and pass that mixed audio stream on to the participant's computing device.

In alternate embodiments, the initial setup of joining a participant's computing device to the multiparty communication session may also include a step of connecting the participant's computing device directly to the media bridge 150. Thereafter, the participant's computing device would send the participant's audio stream directly to the media bridge 150, and the participant's computing device would receive the mixed audio stream directly from the media bridge 150.

The media bridge 150 obtains the individual audio steams from each participant in the multiparty communication session, and a mixer 154 of the media bridge 150 combines the audio streams to create a mixed audio stream that includes the audio contributions of all participants. That mixed audio stream is then provided back to all of the participants.

The individual audio streams received from each of the participants are also provided to a translation service 160. Thus, the translation service 160 receives multiple different audio streams simultaneously, one for each participant. A translated text unit 162 then generates the translated participant text streams and makes those translated participant text streams available to participants of the multiparty communication session, as will be explained in greater detail below. A translated audio unit 164 may also generate translated audio streams for each participant and make those translated audio streams available to the multiparty communication session participants, as will also be explained in detail below.

A translated participant text stream API 146 allows a participant in the multiparty communication session to subscribe to the translated participant text streams of other participants. The translated participant text stream API 146 then facilitates the delivery of subscribed translated participant text streams to the participant, as will be described in detail below.

Similarly, a translated participant audio stream API 148 allows a participant in the multiparty communication session to subscribe to the translated participant audio streams of other participants. The translated participant audio stream API 148 then facilitates the delivery of subscribed translated participant audio streams to the participant, as will be described in detail below.

The translation service 160 may have the internal ability to generate participant text streams from each of the participant audio streams it receives from the media bridge 150 using speech-to-text transcription techniques. However, the translation service 160 may also employ the services of an external transcription service 170 to accomplish the conversion of each participant's audio stream into a text stream.

The translation service 160 may also have the internal ability to translate each participant's text stream into one or more translated participant text streams. However, the translation service 160 may employ the services of an external translation service 172 to generate translations of each participant's text stream into different language text streams.

The translation service 160 may also have the internal ability to convert a participant's translated text stream into a translated audio stream, using text-to-speech techniques. However, the translation service 160 may employ the services of an external text-to-speech service 174 to convert translated participant text streams into translated participant audio streams.

Figure 2:
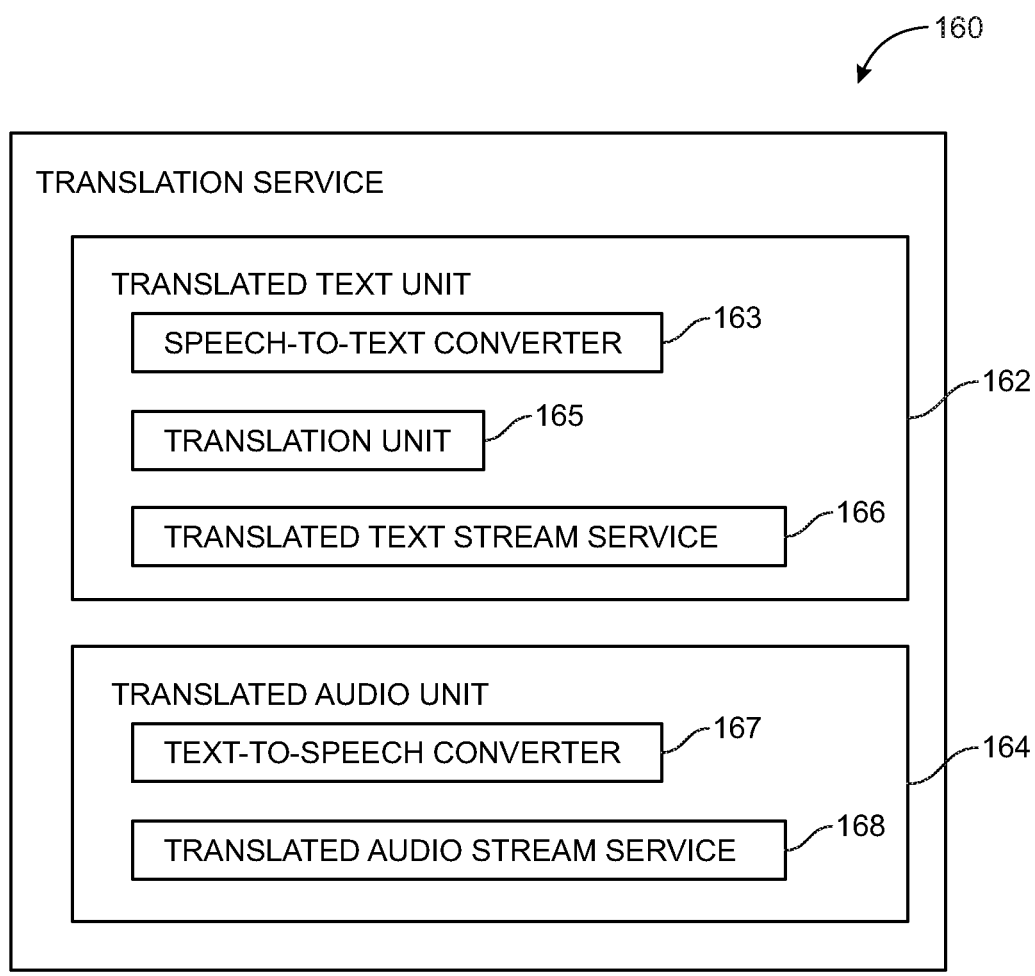
FIG. 2 is a diagram of elements of a translation service embodying the invention.

FIG. 2 illustrates selected elements of a translation service 160 that may embody the invention. The translation service 160 includes a translated text unit 162 that is responsible for receiving individual participant audio streams, for converting those participant audio streams into translated participant text streams, and for making those translated participant text streams available to the participants of a multiparty communication session.

The translated text unit 162 includes a speech-to-text converter 163 which converts individual participant audio streams into participant text streams. This is accomplished using automated computer-based speech-to-text transcription techniques. As mentioned above, in some instances the speech-to-text converter 163 may employ the services of an external transcription service 170 to accomplish the conversion of participant audio streams into participant text streams. The external transcription service can be accessed by an API. Regardless, the speech-to-text conversion could be done in real time as a streaming service, or it could be done in batches based on recordings.

The translated text unit 162 also includes a translation unit 165 that is configured to translate participant text streams into one or more different languages to create translated participant text streams. In some instances, a participant's text stream may only be translated into one other language to create a single translated participant text stream that corresponds to the original participant audio stream received for that participant. In other instances, where more than two languages are being spoken during a multiparty communication session, the translation unit 165 may translate a participant's text stream into multiple different languages to create multiple translated participant text streams, all of which correspond to the original audio stream received for that participant. The language of the translation, and the number of different translations that are created will vary depending on the types and number of different languages being spoken during the multiparty communication session.

As mentioned above, the translation unit 165 may be capable of generating translated participant text streams from the participant text streams provided by the speech-to-text converter 163. In some embodiments, however, the translation unit 165 may employ the services of one or more external translation services 172 to accomplish the conversion of participant text streams into translated participant text streams.

Any translated participant text streams that are created by the translation unit 165 are then passed to the translated text stream service 166 which publishes the translated participant text streams. In this context, publishing the translated participant text streams means making them available to participants in the multiparty communication session. This can be accomplished with the assistance of a translated text application programming interface (API) 146 of the telephony service provider 140.

Note, the process of converting a participant's audio stream into a participant text stream, as performed by the speech-to-text converter 163 is not a discrete process, but rather is an ongoing process. A participant's audio stream is exactly that, a stream of data that is continuously received for as long as the participant remains engaged with the multiparty communication session. Thus, the process of generating a participant's text stream is a continuous one that does not end until the participant leaves the multiparty communication session.

Likewise, the process of converting a participant's text stream into a translated participant text stream is an ongoing process that continues for as long as the participant is connected to the multiparty communication session. This also means that the translated participant text streams that are provided to the translated text stream service 166 are constantly being updated.

When a first participant subscribes to the translated text stream of a second participant, using the services of the translated text API 146, the translated text stream service 166 begins to provide the translated text stream for the second participant to the first participant. This is an ongoing process where data comprising the translated participant text stream for the second participant is constantly streamed to the first participant's computing device.

The translation service 160 may also include a translated audio unit 164 that is configured to generate translated participant audio streams, and to provide those translated participant audio streams to participants of the multiparty communication session. The translated audio unit 164 includes a text-to-speech converter 167 that converts a translated participant's text stream into a translated participant audio stream using computer automated text-to-speech techniques. The text-to-speech converter would receive translated participant text streams from the translation unit 165. Also, the text-to-speech converter 167 may employ the services of an external text-to-speech service 174 to perform its functions.

The translated participant audio streams generated by the text-to-speech converter 167 are then provided to a translated audio stream service 168, which publishes the translated participant audio streams. In this context publishing the translated participant audio streams means making them available to participants in the multiparty communication session. This can be accomplished with the assistance of a translated audio API 148 of the telephony service provider 140.

Here again, the generation of translated participant audio streams by the text-to-speech converter 167 and the provision of those translated participant audio streams to individual participants in the multiparty communication session would be continuously performed for so long as the participants remain connected to the multiparty communication session.

Although FIG. 2 illustrates selected elements of a translation service 160, not all of the elements depicted in FIG. 2 may be present in an embodiment of the invention. Likewise, a translation service embodying the invention may include additional elements that are not present in FIG. 2. Thus, the depiction in FIG. 2 should in no way be considered limiting of the invention.

Figure 3:
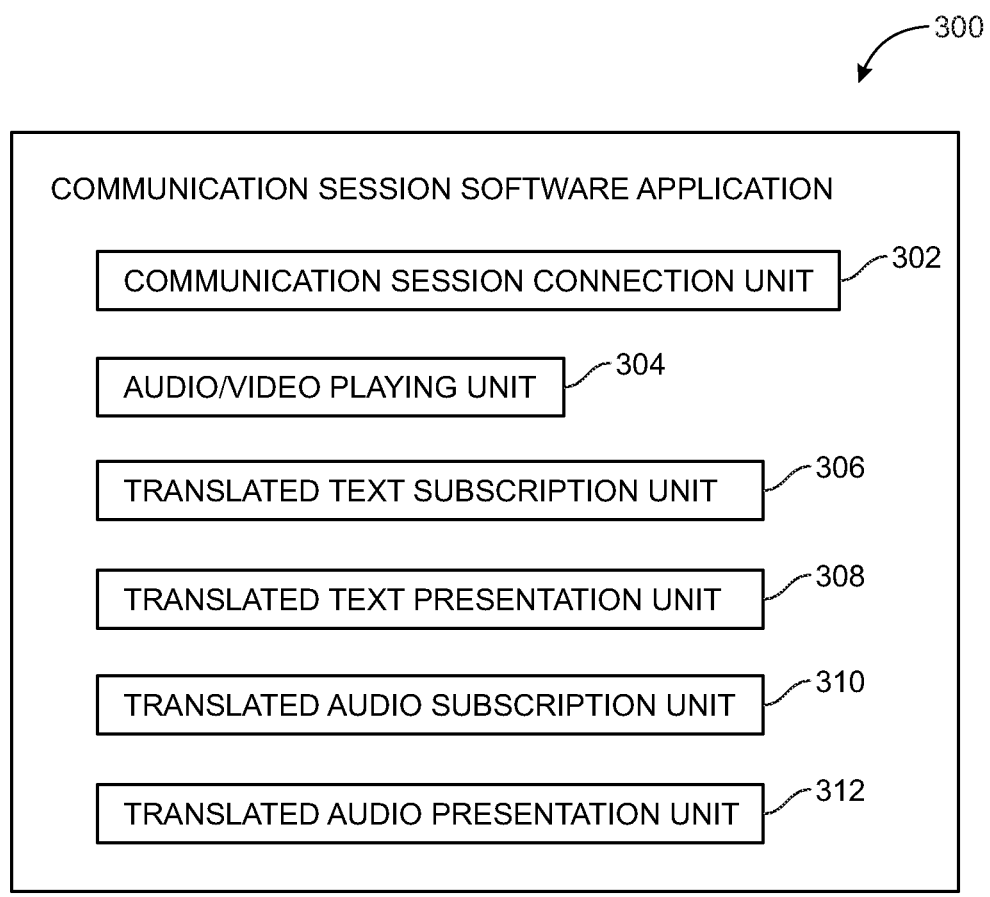
FIG. 3 is a diagram of a communication session software application embodying the invention.

FIG. 3 illustrates selected elements of a communication session software application 300. The communication session software application 300 would be installed on a participant's computing device and would provide the participant with the ability to join a multiparty communication session, and also to obtain translated participant text streams and translated participant audio streams. In some embodiments, the communication session software application 300 may be present on a server, and a participant could access the communication session software application via a web browser.

A participant's computing device could take may different forms. The participant's computing device could be a desktop or laptop computer, a tablet or other handheld computing device, a smartphone, a PDA, or virtually any other computing device which can provide the participant with the means to join and participate in a multiparty communication session. The participant's computing device may include its own audio interface in the form of a speaker and a microphone, or the participant's computing device may be connected to an external audio interface. Similarly, the participant's computing device could include its own display screen, or it could be connected to an external display screen.

The communication session software application 300 includes a communication session connection unit 302 that is responsible for connecting the participant to a multiparty communication session. The communication session connection unit 302 may be configured to contact and interact with a communication session API 144 of a telephony service provider 140 to connect the participant's computing device to a multiparty communication session.

The communication session connection unit 302 would send a request to join a multiparty communication session to the communication session API 144 to initiate the process. That request may include information about the participant, and information about the configuration and capabilities of the participant's computing device. The request may also provide an identifier for the participant or the participant's computing device. Further, the request may provide an indication of the language that the participant will use while interacting with others on the multiparty communication session.

Once the communication session connection unit 302 has successfully joined the participant to a multiparty communication session, an audio stream that contains the participant's contributions to the multiparty communication session is sent from the participant's computing device to the media bridge 150 of the telephony service provider 140. If the multiparty communication session is a video conference, a stream of data that includes video may also be sent from the participant's computing device to the media bridge 150.

As mentioned above a mixer 154 of the media bridge 150 combines the contributions of all participants in the multiparty communication session to create a mixed stream. In the case of an audio conference, the mixed stream is a mixed audio stream. If the multiparty communication session of a video conference, the mixed stream would be some sort of video stream. The mixed video stream could be configured in a variety of different ways, as is known to those of skill in the art. However, the mixed video stream would likely include the audio contributions of all participants, and some sort of video presentation. This mixed stream would then be sent to the participant's computing device.

The mixed stream sent to the participant's computing device is then played/displayed to the participant by an audio/video playing unit 304 of the communication session software application 300. In some instances, this means playing audio over an audio interface of the participant's computing device and/or displaying video on a display screen of the participant's computing device. In some instances, this could include playing mixed audio to the participant via an external audio interface and/or displaying video to the participant via an external display screen.

At this point, the participant will be joined to the multiparty communication session. However, the participant will not yet be accessing any of the translation services provided by a translation service 160 of the telephony service provider 140.

A translated text subscription unit 306 of the communication software application 300 enables the participant to subscribe to the translated text streams of other participants. The translated text subscription unit 306 would interact with a translated text API 146 of the telephony service provider 140 to inform the translated text stream service 166 of the translation service 160 about which participant's translated text streams the participant would like to view. This could include identifying individual participants. Alternatively, the participant could simply indicate that the participant would like to view translated participant text streams for all participants that speak different languages. Further, a request sent from the translated text subscription unit 306 could indicate the language in which the translated participant text streams should appear.

Once the translated text subscription unit 306 has subscribed the participant to all desired translated participant text streams, the translated text stream service 166 begins to stream data for those translated participant text streams to the participant's computing device. A translated text presentation unit 308 receives that streamed data and causes the translated participant text streams to be presented to the participant on a display screen viewable to the participant. The translated participant text streams could be presented in a variety of different ways. In some instances, each of the subscribed participant text streams would be presented separately, and possibly be attributed to the correct participant in some fashion. In other instances, the translated participant text streams may simply be presented together as part of a single continuously running text stream. The way in which translated participant test streams are presented may be configurable to satisfy individual preferences.

If the translation service 160 also offers translated participant audio streams, a translated audio subscription unit 310 of the software application 300 would allow a participant to subscribe to one or more translated participant audio streams. The translated audio subscription unit 310 would interact with a translated audio API 148 of the telephony service provider 140 to subscribe the participant to one or more translated participant audio streams. Thereafter, the translated audio stream service 168 of the translation service 160 would send a stream of data comprising the subscribed-to translated participant audio streams to the participant's computing device. A translated audio presentation unit 312 would then play that audio to the participant.

The audio that comprises a translated participant's audio stream could be played to the participant in various different ways. If a first participant has subscribed to the translated participant audio stream of a second participant, the second participant's translated audio stream could be played separately to the first participant via a different audio interface than the audio interface that is used to play the mixed audio of all participants on the multiparty communication session. In other instances, when the second participant speaks on the multiparty communication session, the mixed audio could be muted and the translated participant audio stream for the second participant could be played to the first participant.

Figure 4:
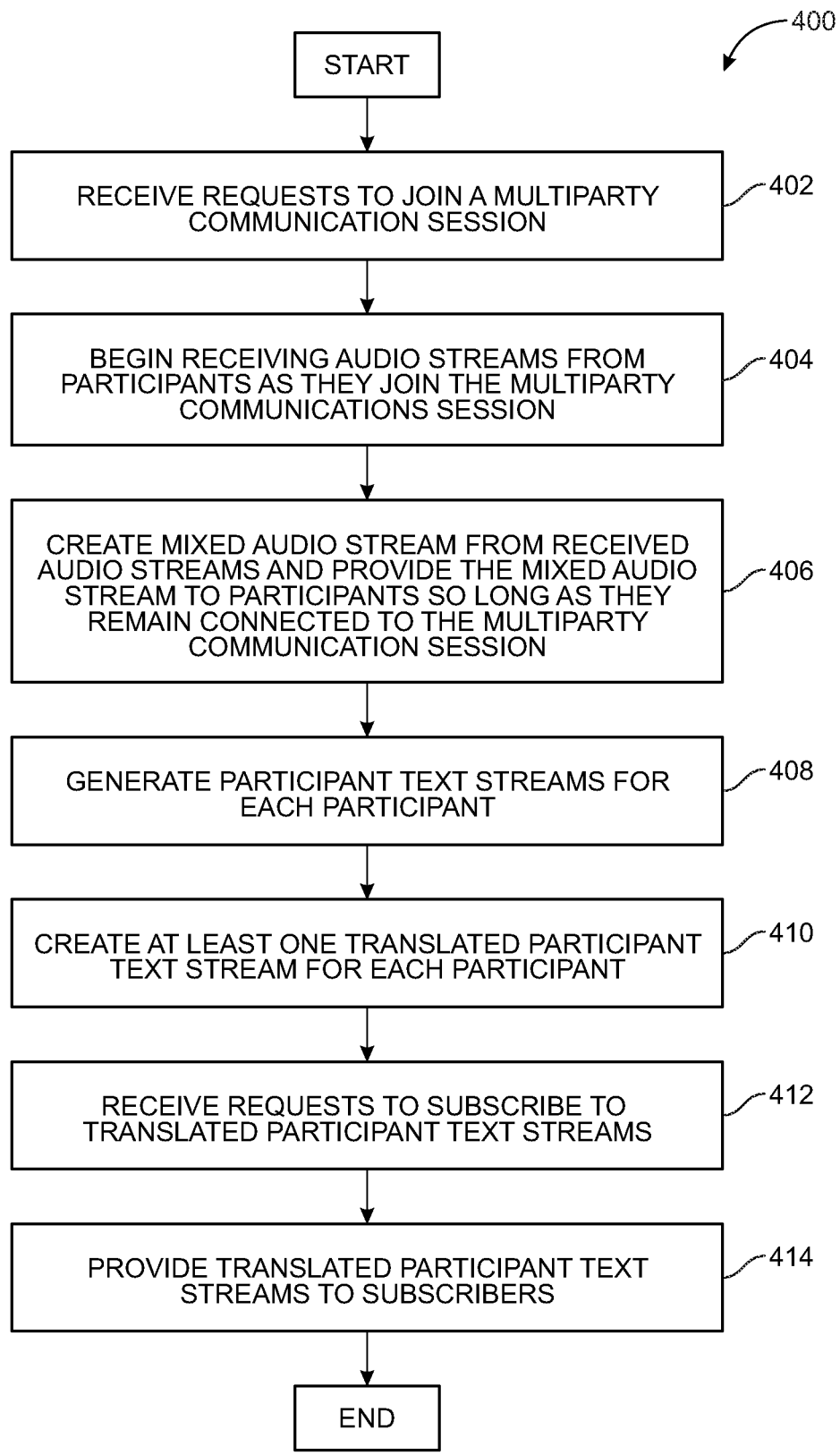
FIG. 4 is a flowchart illustrating steps of a first method embodying the invention that would be performed by elements of a telephony service provider.

A first method embodying the invention that would be performed by elements of a telephony service provider 140 will now be described with reference to the flowchart appearing in FIG. 4. This method 400 begins and proceeds to step 402, where a request to join a multiparty communication session is received from a communication session connection unit 302 of a communication session software application 300 installed on a participant's computing device. The request may be received via a communication session API 144 of the telephony service provider 140. The request may include an identification of the participant and/or the participant's computing device. The request may also specify the language that the participant will speak during the multiparty communication session.

Once the participant has been joined to the multiparty communication session, in step 404 the media bridge 150 will begin receiving an audio stream from the participant's computing device that represents the participant's audio contribution to the multiparty communication session. The media bridge 150 will thereafter continue to receive the audio stream so long as the participant remains joined to the multiparty communication session.

In step 406, a mixer 154 of the media bridge 150 mixes the audio contributions of all participants to the multiparty communication session to create a mixed audio stream. That mixed audio stream is then provided back to each of the participants in the multiparty communication session.

The individual audio streams from each of the participants that are received by the media bridge 150 are also provided to a translation service 160. In step 408, a speech-to-text converter 163 creates individual text streams for each participant using the received audio streams for each participant. In step 410, a translation unit 165 creates at least one translated participant text stream for each participant using the text streams that were created for each participant. If there are more than two languages being spoken by participants to the multiparty communication session, step 410 may involve creating multiple translated participant text streams for each participant, one for each of the multiple languages.

In step 412, a translated text stream service 166 receives a request to subscribe to one of the translated participant text streams from translated text stream subscription unit 306 of a software application 300 on one of the participant's computing devices. That request could be received via a translated text API 146 of the telephony service provider 140. The translated text stream service 166 could receive a subscription request from one participant for the translated participant text streams of multiple other participants. In step 414, the translated text stream service 166 begins providing translated participant text streams to those participants that subscribed in step 412.

The actions occurring in steps 404-410 and 414 would be continuous and ongoing for the duration of the multiparty communication session. Once the multiparty communication session ends, the method would end.

Figure 5:
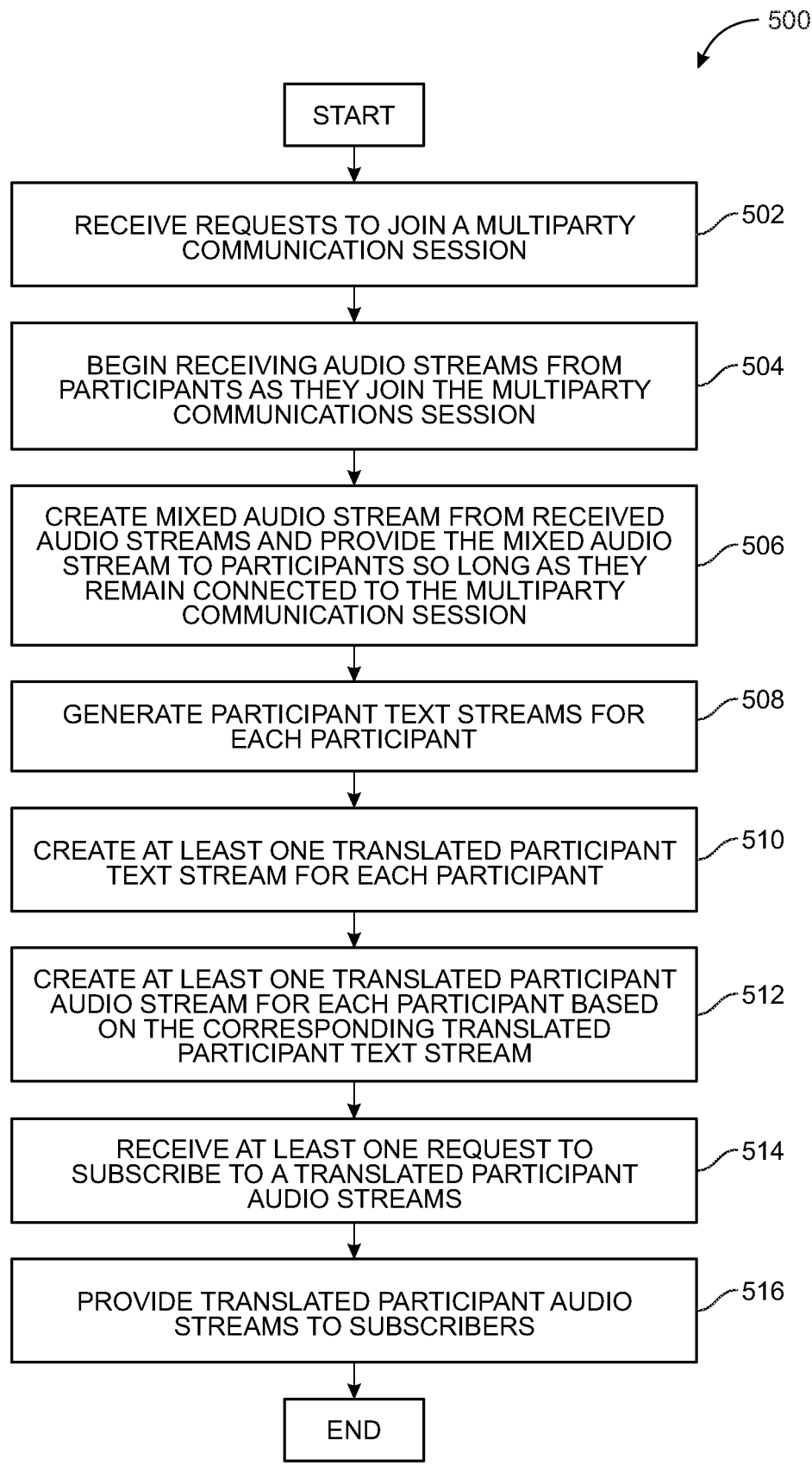
FIG. 5 is a flowchart illustrating steps of a second method embodying the invention that would be performed by elements of a telephony service provider.

FIG. 5 depicts a flowchart illustrating steps of second method embodying the invention that would be performed by elements of a telephony service provider 140. The method 500 begins and proceeds to step 502, where a request to join a multiparty communication session is received from a communication session connection unit 302 of a communication session software application 300 installed on a participant's computing device. The request may be received via a communication session API 144 of the telephony service provider 140. The request may include an identification of the participant and/or the participant's computing device. The request may also specify the language that the participant will speak during the multiparty communication session.

Once the participant has been joined to the multiparty communication session, in step 504 a media bridge 150 begins receiving an audio stream from the participant's computing device that represents the participant's audio contribution to the multiparty communication session. The media bridge 150 will thereafter continue to receive the audio stream so long as the participant remains joined to the multiparty communication session.

In step 506, a mixer 154 of the media bridge 150 mixes the audio contributions of all participants to the multiparty communication session to create a mixed audio stream. That mixed audio stream is then provided back to each of the participants in the multiparty communication session.

The individual audio streams from each of the participants that are received by the media bridge 150 are also provided to a translation service 160. In step 508, a speech-to-text converter 163 creates individual text streams for each participant using the received audio streams for each participant. In step 510, a translation unit 165 creates at least one translated participant text stream for each participant using the text streams that were created for each participant. If there are more than two languages being spoken by participants to the multiparty communication session, step 510 may involve creating multiple translated participant text streams for each participant, one for each of the multiple languages.

In step 512, a speech-to-text converter 167 creates a translated participant audio stream for each participant using the translated participant text streams for each participant. Here again, if more than two languages are being spoken, step 512 may involve creating multiple translated participant audio streams for each participant, one for each of the multiple languages.

In step 514, a translated audio stream service 168 receives a request to subscribe to one of the translated participant audio streams from a translated audio stream subscription unit 310 of a software application 300 on one of the participant's computing devices. The translated audio stream service 168 could receive a subscription request from one participant for the translated participant audio streams of multiple other participants. In step 516, the translated audio stream service 168 begins providing translated participant audio streams to those participants that subscribed in step 514.

The actions occurring in steps 504-512 and 516 would be continuous and ongoing for the duration of the multiparty communication session. Once the multiparty communication session ends, the method would end.

Figure 6:
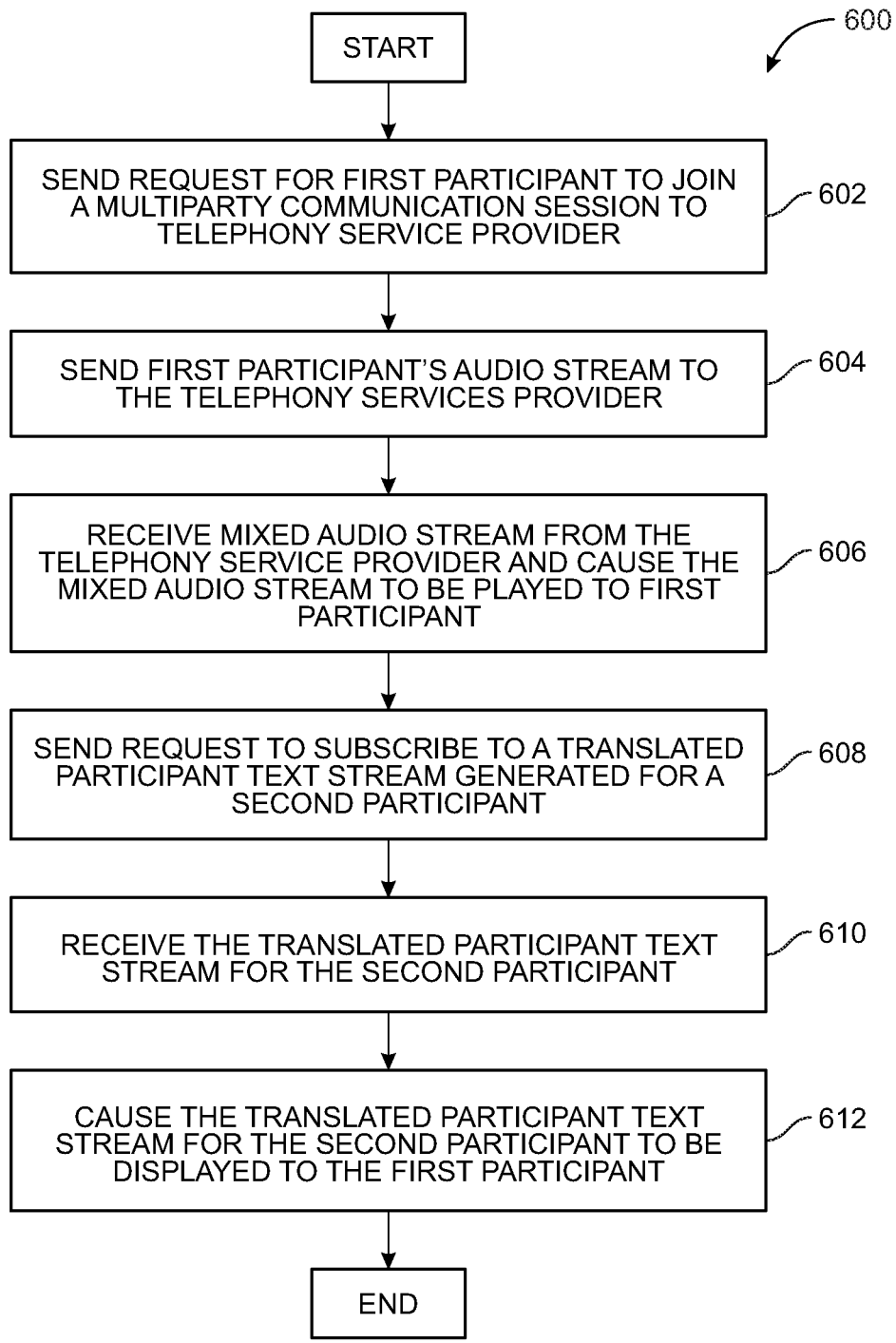
FIG. 6 is a flowchart illustrating steps of a third method embodying the invention that would be performed by elements of a communication session software application.

FIG. 6 presents a flowchart illustrating steps of a third method embodying the invention that would be performed by elements of a communication session software application on a participant's computing device. The method 600 begins and proceeds to step 602 where a communication session connection unit 302 sends a request to join a participant to a multiparty communication session to a telephony service provider 140. That request may be sent to a communication session API 144 of the telephony service provider 140. The communication session software application 300 and elements of the telephony service provider 140 then connect the participant's computing device to the multiparty communication session.

In step 604, an audio stream that represents the participant's contribution to the multiparty communication session is sent from the participant's computing device to a media bridge 150 of the telephony service provider 140. In step 606, a mixed audio stream that represents all participants' contributions to the multiparty communication session is received at the participant's computing device, and an audio/video playing unit 304 causes the mixed audio to be played to the participant.

In step 608, a translated text subscription unit 306 of the communication session software application 300 sends a request to subscribe to one or more translated participant text streams to a translated text stream service 166 of a translation service 160 of the telephony service provider 140. That subscription request may be sent via a translated text API 146 of the telephony service provider 140.

In step 610, the requested translated participant text stream(s) are received back at the participant's computing device. In step 612, a translated text presentation unit 308 causes the requested translated participant text stream(s) to be presented to the participant.

The actions performed in steps 604, 606, 610 and 612 would be continuous and ongoing for the duration of the multiparty communication session. When the multiparty communication session ends, the method ends.

Figure 7:
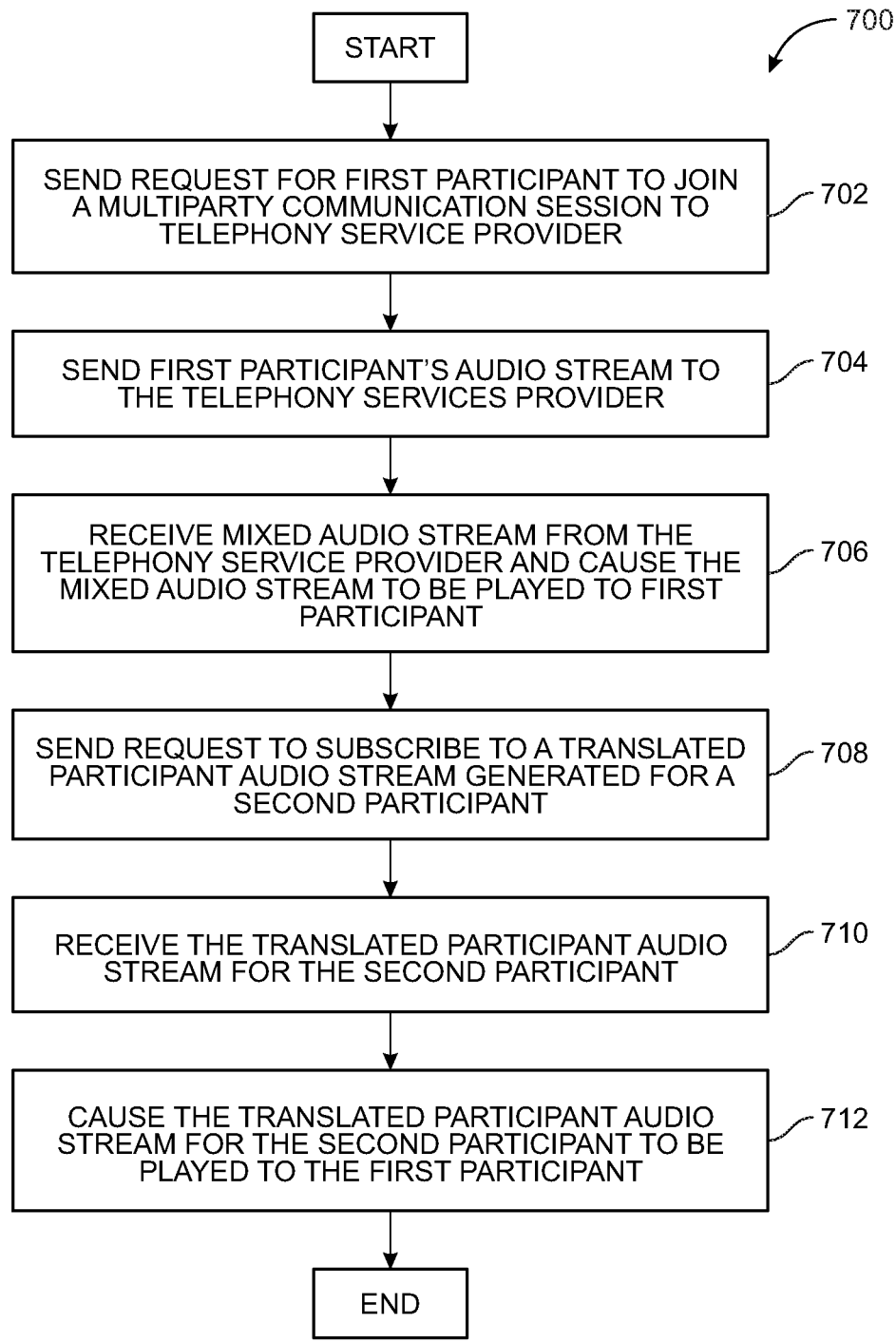
FIG. 7 is a flowchart illustrating steps of a fourth method embodying the invention that would be performed by elements of a communication session software application.

FIG. 7 illustrates steps of a fourth method embodying the invention that would be performed by elements of a communication session software application on a participant's computing device. The method 700 begins and proceeds to step 702 where a communication session connection unit 302 sends a request to join a participant to a multiparty communication session to a telephony service provider 140. That request may be sent to a communication session API 144 of the telephony service provider 140. The communication session software application 300 and elements of the telephony service provider 140 then connect the participant's computing device to the multiparty communication session.

In step 704, an audio stream that represents the participant's contribution to the multiparty communication session is sent from the participant's computing device to a media bridge 150 of the telephony service provider 140. In step 706, a mixed audio stream that represents all participants' contributions to the multiparty communication session is received at the participant's computing device, and an audio/video playing unit 304 causes the mixed audio to be played to the participant.

In step 708, a translated audio subscription unit 310 of the communication session software application 300 sends a request to subscribe to one or more translated participant audio streams to a translated audio stream service 168 of a translation service 160 of the telephony service provider 140. That subscription request may be sent via a translated audio API 148 of the telephony service provider 140.

In step 710, the requested translated participant audio stream(s) are received back at the participant's computing device. In step 712, a translated audio presentation unit 312 causes the requested translated participant text stream(s) to be presented to the participant.

The actions performed in steps 704, 706, 710 and 712 would be continuous and ongoing for the duration of the multiparty communication session. When the multiparty communication session ends, the method ends.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module" or "unit." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
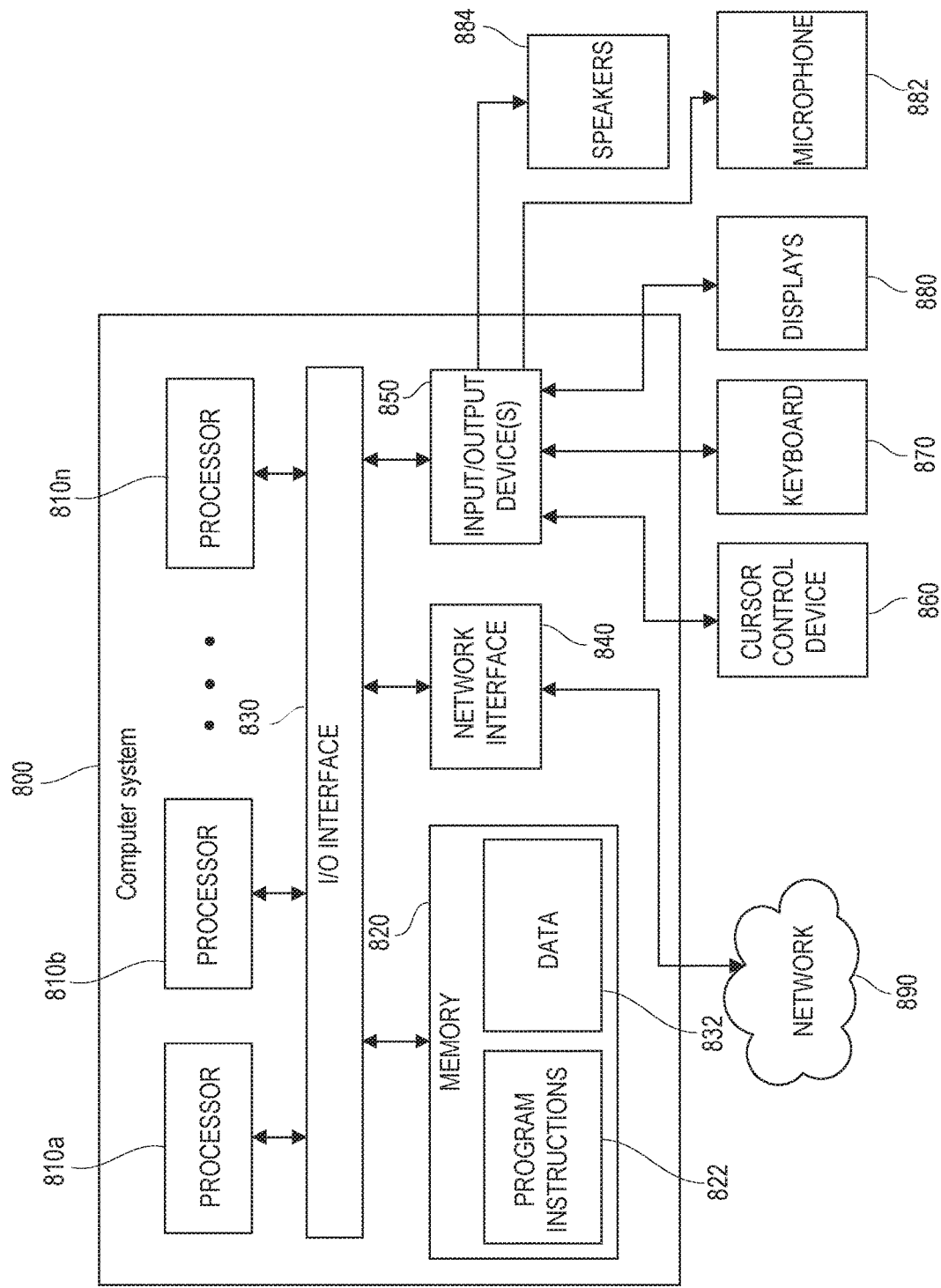
FIG. 8 is a diagram of a computer system and associated peripherals which could embody the invention, or which could be used to practice methods embodying the invention.

FIG. 8 depicts a computer system 800 that can be utilized in various embodiments of the present invention to implement the invention according to one or more embodiments. The various embodiments as described herein may be executed on one or more computer systems, which may interact with various other devices. One such computer system is the computer system 800 illustrated in FIG. 8. The computer system 800 may be configured to implement the methods described above. The computer system 800 may be used to implement any other system, device, element, functionality or method of the above-described embodiments. In the illustrated embodiments, the computer system 800 may be configured to implement the disclosed methods as processor-executable executable program instructions 822 (e.g., program instructions executable by processor(s) 810) in various embodiments.

In the illustrated embodiment, computer system 800 includes one or more processors 810a-810n coupled to a system memory 820 via an input/output (I/O) interface 830. Computer system 800 further includes a network interface 840 coupled to I/O interface 830, and one or more input/output devices 850, such as cursor control device 860, keyboard 870, display(s) 880, microphone 882 and speakers 884. In various embodiments, any of the components may be utilized by the system to receive user input described above. In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, the computer system 800 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the operations and methods described above, such as the methods illustrated by the flowcharts of FIGS. 4-7. In other embodiments, different elements and data may be included.

Those skilled in the art will appreciate that the computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing a translation-enabled, multiparty communications session, comprising:
receiving a plurality of requests to join a translation-enabled, multiparty communications session from a corresponding plurality of communication session participants via a multiparty communication session application programming interface (API);
receiving an individual audio stream from each of the communication session participants;
mixing the received individual audio streams from the communication session participants to create a mixed audio stream;
providing the mixed audio stream to the communication session participants;

generating a participant text stream for each participant by providing the separate individual audio streams received from each of the communication session participants to a speech-to-text transcription service that converts each individual received communication session participant audio stream into a participant text stream in a first language using computer automated speech-to-text techniques;

creating at least one translated participant text stream for each participant by translating each participant's text stream into a text stream in a second language; and publishing the translated participant text streams.

2. The method of claim 1, wherein creating at least one translated participant text stream for each participant comprises creating multiple translated participant text streams for each participant by translating each participant's text stream into multiple text streams in different languages.

3. The method of claim 1, wherein publishing the translated participant text streams comprises making the translated participant text streams available to communication session participants via an application programming interface (API).

4. The method of claim 1, wherein publishing the translated participant text streams comprises:
receiving requests for translated participant text streams from communication session participants via a translation service application programming interface (API); and
sending translated participant text streams to communication session participants via the translation service API in response to the received requests.

5. The method of claim 1, wherein receiving an individual audio stream from each of the communication session participants comprises receiving data from the communication session participants via the multiparty communication session API.

6. The method of claim 5, wherein providing the mixed audio stream to the communication session participants comprises providing data comprising the mixed audio stream to the communication session participants via the multiparty communication session API.

7. The method of claim 1, wherein the received requests to join a translation-enabled, multiparty communications session include, for each participant, an indication of the language that will be spoken by the participant during the multiparty communication session.

8. The method of claim 1, further comprising monitoring the received individual audio streams from the multiparty communication session participants to determine, for each participant, the language being spoken by the participant.

9. The method of claim 1, further comprising:
creating at least one translated participant audio stream for each participant by converting the participant's translated text stream into a translated audio stream using computer automated text-to-speech techniques; and
publishing the translated participant audio streams.

10. The method of claim 9, wherein publishing the translated participant audio streams comprises making the translated participant audio streams available to communication session participants via an application programming interface (API).

11. The method of claim 1, wherein the generating step is performed by a transcription service that receives each communication session participant's individual audio stream and that uses each communication session participant's individual audio stream to generate a corresponding individual participant text stream.

12. A system for providing a translation-enabled, multiparty communications session, comprising:
a communication session application programming interface (API) that is configured to receive a plurality of requests to join a translation-enabled, multiparty communications session from a corresponding plurality of communication session participants and that is configured to receive an individual audio stream from each of the communication session participants;
a media bridge that is configured to mix the received individual audio streams from the communication session participants to create a mixed audio stream and that enables the communication session API to provide the mixed audio stream to the communication session participants;
a translation service that generates a participant text stream for each participant by providing the separate individual audio streams received from each of the communication session participants to a speech-to-text transcription service that converts each individual received communication session participant audio stream into a participant text stream in a first language using computer automated speech-to-text techniques and that creates at least one translated participant text stream for each participant by translating each participant's text stream into a text stream in a second language; and
a translated text API that publishes the translated participant text streams.

13. The system of claim 12, wherein the translation service creates multiple translated participant text streams for each participant by translating each participant's text stream into multiple text streams in different languages.

14. The system of claim 12, wherein the translated text API makes the translated participant text streams available to communication session participants.

15. The system of claim 12, wherein the translated text API publishes the translated participant text streams by:
receiving requests for translated participant text streams from communication session participants; and
sending translated participant text streams to communication session participants in response to the received requests.

16. The system of claim 12, wherein the communication session API provides the mixed audio stream to communication session participants by providing data comprising the mixed audio stream to the communication session participants.

17. The system of claim 12, wherein the received requests to join a translation-enabled, multiparty communications session include, for each participant, an indication of the language that will be spoken by the participant during the multiparty communication session.

18. The system of claim 12, wherein the translation service monitors the received individual audio streams from the multiparty communication session participants to determine, for each participant, the language being spoken by the participant.

19. The system of claim 12, wherein the translation service also creates at least one translated participant audio stream for each participant by converting the participant's translated text stream into a translated audio stream using computer automated text-to-speech techniques and further comprising a translated audio API that publishes the translated participant audio streams.

20. The system of claim 12, wherein the translation service receives each communication session participant's individual audio stream and uses each communication session participant's individual audio stream to generate a corresponding individual participant text stream.

21. The system of claim 12, further comprising the translation service that generates the individual communication session participant text streams.

\* \* \* \* \*